United States Patent
Shen et al.

(10) Patent No.: US 12,088,375 B2
(45) Date of Patent: Sep. 10, 2024

(54) BEAMFORMING METHOD AND APPARATUS

(71) Applicant: HUAWEI TECHNOLOGIES CO., LTD., Guangdong (CN)

(72) Inventors: Long Shen, Shanghai (CN); Guanxi Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/824,866

(22) Filed: May 25, 2022

(65) Prior Publication Data

US 2022/0286173 A1 Sep. 8, 2022

Related U.S. Application Data

(63) Continuation of application No. PCT/CN2020/130045, filed on Nov. 19, 2020.

(30) Foreign Application Priority Data

Nov. 26, 2019 (CN) .......................... 201911175203.3

(51) Int. Cl.
*H04B 7/06* (2006.01)
*H04B 1/04* (2006.01)

(52) U.S. Cl.
CPC ............. *H04B 7/0617* (2013.01); *H04B 1/04* (2013.01); *H04B 7/0608* (2013.01); *H04B 2001/0408* (2013.01)

(58) Field of Classification Search
CPC ............. H01Q 1/42; H01Q 1/52; H01Q 3/22; H01Q 3/34; H01Q 3/36; H01Q 21/00;
(Continued)

(56) References Cited

U.S. PATENT DOCUMENTS

| 4,882,588 A | 11/1989 | Renshaw et al. |
| 2015/0009069 A1 | 1/2015 | Yun et al. |

(Continued)

FOREIGN PATENT DOCUMENTS

| CN | 101369014 A | 2/2009 |
| CN | 102017306 A | 4/2011 |

(Continued)

OTHER PUBLICATIONS

Huang Shimin, Smart Materials R and D. Aeronautical Science and Technology , 1999, 3 pages.

(Continued)

*Primary Examiner* — Shawkat M Ali
(74) *Attorney, Agent, or Firm* — Gregg Jansen

(57) ABSTRACT

A beamforming method and apparatus are provided. A beamforming apparatus according to one embodiment comprises a beamforming module comprising a beam port configured to provide electrical signals; an antenna array comprising a plurality of antenna ports; and a feeding network disposed between and coupling the beam port and the antenna ports. The feeding network is configured to shunt the electrical signals provided by the beam port to the plurality of antenna ports, the electrical signals received at the antenna ports being used to control shapes of beams formed by the antenna array. An amplitude of an electrical signal shunted to an antenna port and an operating frequency of the antenna array meet a first correspondence. A phase difference between electrical signals shunted to two different antenna ports and the operating frequency meet a second correspondence.

10 Claims, 8 Drawing Sheets

(58) Field of Classification Search
CPC ........ H01Q 21/06; H01Q 21/24; H01Q 25/02; H04B 1/04; H04B 1/44; H04B 7/00; H04B 7/02; H04B 7/06; H04B 7/0452; H04B 7/0608; H04B 7/0617; H04B 17/12; H04B 2001/0408; H04L 5/14; H04L 27/26; H04W 16/28; H04W 40/00; H04W 88/08
USPC ......... 342/368, 372–373; 375/219, 260, 267, 375/295, 316
See application file for complete search history.

(56) References Cited

U.S. PATENT DOCUMENTS

| | | | |
|---|---|---|---|
| 2016/0013563 | A1 | 1/2016 | Timofeev et al. |
| 2016/0069674 | A1 | 3/2016 | Govoni et al. |
| 2017/0141481 | A1* | 5/2017 | Geng ........................ H01Q 3/40 |
| 2018/0013210 | A1 | 1/2018 | Rosenkrantz et al. |
| 2018/0053998 | A1* | 2/2018 | Ashida ................... H01Q 3/267 |
| 2018/0115360 | A1 | 4/2018 | Niknejad et al. |
| 2019/0267721 | A1 | 8/2019 | Yoon et al. |
| 2019/0305435 | A1 | 10/2019 | Robinson et al. |
| 2021/0029556 | A1* | 1/2021 | Wu ........................ H01Q 15/14 |

FOREIGN PATENT DOCUMENTS

| | | |
|---|---|---|
| CN | 102257674 A | 11/2011 |
| CN | 102683897 A | 9/2012 |
| CN | 102857287 A | 1/2013 |
| CN | 103312346 A | 9/2013 |
| CN | 104103910 A | 10/2014 |
| CN | 105162528 A | 12/2015 |
| CN | 105742828 A | 7/2016 |
| CN | 107732464 A | 2/2018 |
| CN | 208189786 U | 12/2018 |
| CN | 110402521 A | 11/2019 |
| CN | 112952375 A | 6/2021 |
| TW | 201838352 A | 10/2018 |
| WO | 2009052218 A1 | 4/2009 |
| WO | 2017127378 A1 | 7/2017 |
| WO | 2018047234 A1 | 3/2018 |

OTHER PUBLICATIONS

Zhang Guanxi, Study on Key Techniques of Mobile Communication Antennas. Xidian University, 2017, 1 page.
Sepideh Shahidizandi et al., Blind Beamforming for Conformal Arrays. IEEE Antennas and Wireless Propagation Letters, vol. 16, 2017, 4 pages.

* cited by examiner

BEAMFORMING METHOD AND APPARATUS

CROSS-REFERENCE TO RELATED APPLICATIONS

This application is a continuation of International Application No. PCT/CN2020/130045, filed on Nov. 19, 2020, which claims priority to Chinese Patent Application No. 201911175203.3, filed on Nov. 26, 2019. The disclosures of the aforementioned applications are hereby incorporated by reference in their entireties.

TECHNICAL FIELD

This application relates to the communication field, and more specifically, to a beamforming method and apparatus.

BACKGROUND

In a wireless communication system, an antenna is an important device connecting an air interface and a circuit. As mobile communication technologies develop, a communication system has an increasingly high requirement on capacity. To increase a capacity of the system, a multibeam antenna device may be used. The multibeam antenna device usually includes a beamforming module, an antenna array, and a feeding network connecting the beamforming module and the antenna array.

An existing multibeam forming method is usually implemented based on a Butler feeding network. It is difficult to ensure that shapes of formed beams do not change at a specific wideband. Therefore, how to enable formed beams to basically maintain stable directions and beam widths at a specific wideband becomes an urgent problem to be resolved.

SUMMARY

This application provides a beamforming method and apparatus, to improve, by controlling a pattern in which an amplitude of an electrical signal shunted to an antenna port on an antenna array changes with an operating frequency of the antenna array and a pattern in which a phase difference between electrical signals shunted to different antenna ports on the antenna array changes with the operating frequency of the antenna array, shape-maintaining capabilities of beams formed by the antenna array at different operating frequencies.

According to a first aspect, a beamforming apparatus is provided, including: a beamforming module, where the beamforming module includes a beam port configured to provide electrical signals, the beamforming module may also be referred to as a beamforming unit or an electrical signal network, a name of the beamforming module that provides electrical signals is not limited in this application, and there is only a limitation that the beamforming module can be configured to provide electrical signals and includes a beam port that outputs electrical signals; an antenna array, where the antenna array includes a plurality of antenna ports; and a feeding network, where the feeding network is disposed between the beam port and the antenna ports and configured to shunt the electrical signals provided by the beam port to the antenna ports, and the electrical signals received at the antenna ports on the antenna array are used to control shapes of beams formed by the antenna array, where an amplitude of an electrical signal shunted to an antenna port on the antenna array and an operating frequency of the antenna array meet a first correspondence, and a phase difference between electrical signals shunted to two antenna ports on the antenna array and the operating frequency meet a second correspondence.

According to the beamforming apparatus provided in this embodiment of this application, a pattern in which an amplitude of an electrical signal shunted to an antenna port on the antenna array changes with the operating frequency of the antenna array and a pattern in which a phase difference between the electrical signals shunted to different antenna ports on the antenna array changes with the operating frequency of the antenna array are controlled, thereby improving shape-maintaining capabilities of beams formed by the antenna array at different operating frequencies.

With reference to the first aspect, in some implementations of the first aspect, the amplitude of the electrical signal shunted to the antenna port decreases as the operating frequency increases, and the phase difference between the electrical signals shunted to the different antenna ports on the antenna array increases as the operating frequency increases.

According to the beamforming apparatus provided in this embodiment of this application, the pattern in which the amplitude of the electrical signal shunted to the antenna port changes with the operating frequency of the antenna array and the pattern in which the phase difference between the electrical signals shunted to the different antenna ports on the antenna array changes with the operating frequency of the antenna array may be as follows: The amplitude decreases as the operating frequency increases, and the phase difference increases as the operating frequency increases.

With reference to the first aspect, in some implementations of the first aspect, the amplitude of the electrical signal shunted to the antenna port and the operating frequency meet: $R = A1*X^4 + B1*X^3 + C1*X^2 + D1*X + E1$, where R represents the amplitude of the electrical signal, X represents the operating frequency, and A1, B1, C1, D1, and E1 are preset values; and the phase difference between the electrical signals shunted to the different antenna ports on the antenna array and the operating frequency meet: $\Delta P = A2*(300/X)*d*B2$, where $\Delta P$ represents the phase difference between the electrical signals at the different antenna ports, X represents the operating frequency, d represents a distance between the two different antenna ports, and A2 and B2 are preset values.

According to the beamforming apparatus provided in this embodiment of this application, the pattern in which the amplitude of the electrical signal shunted to the antenna port changes with the operating frequency of the antenna array and the pattern in which the phase difference between the electrical signals shunted to the different antenna ports on the antenna array changes with the operating frequency of the antenna array meet preset correspondences, thereby enabling an amplitude of an electrical signal shunted to an antenna port and a phase difference between electrical signals shunted to different antenna ports to be designed based on different operating frequencies according to the preset correspondences.

With reference to the first aspect, in some implementations of the first aspect, the feeding network is a power divider.

According to the beamforming apparatus provided in this embodiment of this application, an implementation of the feeding network is a power divider.

With reference to the first aspect, in some implementations of the first aspect, the power divider includes one input port and 10 output ports, the 10 output ports respectively provide an electrical signal for 10 antenna ports, and the amplitude of the electrical signal shunted to the antenna port includes:

| Port | Frequency | | | | |
|---|---|---|---|---|---|
| | 1.710 GHz | 1.955 GHz | 2.200 GHz Amplitude | 2.445 GHz | 2.690 GHz |
| 1 | 0.59 | 0.33 | 0.18 | 0.1 | 0.09 |
| 2 | 0.64 | 0.47 | 0.37 | 0.29 | 0.27 |
| 3 | 0.78 | 0.7 | 0.62 | 0.56 | 0.54 |
| 4 | 0.92 | 0.89 | 0.86 | 0.83 | 0.82 |
| 5 | 1 | 1 | 1 | 1 | 1 |
| 6 | 1 | 1 | 1 | 1 | 1 |
| 7 | 0.92 | 0.89 | 0.86 | 0.83 | 0.82 |
| 8 | 0.78 | 0.7 | 0.62 | 0.56 | 0.54 |
| 9 | 0.64 | 0.47 | 0.37 | 0.29 | 0.27 |
| 10 | 0.59 | 0.33 | 0.18 | 0.1 | 0.09 |

A phase of the electrical signal shunted to the antenna port includes:

| Port | Frequency | | | | |
|---|---|---|---|---|---|
| | 1.710 GHz | 1.955 GHz | 2.200 GHz Phase | 2.445 GHz | 2.690 GHz |
| 1 | 0 | 0 | 0 | 0 | 0 |
| 2 | 30 | 33.7 | 37 | 40.7 | 44 |
| 3 | 60 | 67.4 | 74 | 81.4 | 88 |
| 4 | 90 | 101.1 | 111 | 122.1 | 132 |
| 5 | 120 | 134.5 | 148 | 162.8 | 176 |
| 6 | 150 | 168.26 | 185 | 203.5 | 220 |
| 7 | 180 | 201.9 | 222 | 244.2 | 264 |
| 8 | 210 | 235.54 | 259 | 284.9 | 308 |
| 9 | 240 | 269.18 | 296 | 325.6 | 352 |
| 10 | 270 | 302.82 | 333 | 366.3 | 396 |

With reference to the first aspect, in some implementations of the first aspect, a plurality of antenna arrays are divided into two columns of antenna arrays in a direction perpendicular to a horizontal plane; and a director or a reflector is disposed between every two corresponding antenna arrays of the two columns of antenna arrays in a vertical direction, where an even-numbered antenna array numbered from top to bottom in a vertical direction in one column of antenna arrays and an odd-numbered antenna array numbered from top to bottom in a vertical direction in the other column of antenna arrays form an antenna array group, and directions of beams formed by the antenna arrays in the antenna array group are changed by the director or the reflector.

According to the beamforming apparatus provided in this embodiment of this application, the plurality of antenna arrays may be arranged in a shape of a "snake", to reduce a total antenna size.

According to a second aspect, a beamforming method is provided, including: A feeding network receives electrical signals from a beamforming module, where the beamforming module includes a beam port configured to provide the electrical signals; and the feeding network shunts the electrical signals to a plurality of antenna ports on an antenna array, where the electrical signals received at the antenna ports are used to control shapes of beams formed by the antenna array. An amplitude of an electrical signal shunted to an antenna port on the antenna array and an operating frequency of the antenna array meet a first correspondence, and a difference between electrical signals shunted to two different antenna ports on the antenna array and the operating frequency meet a second correspondence.

According to the beamforming method provided in this embodiment of this application, a pattern in which the amplitude of the electrical signal shunted to the antenna port on the antenna array changes with the operating frequency of the antenna array and a pattern in which the phase difference between the electrical signals shunted to the different antenna ports on the antenna array changes with the operating frequency of the antenna array are controlled, thereby improving shape-maintaining capabilities of beams formed by the antenna array at different operating frequencies.

With reference to the second aspect, in some implementations of the second aspect, the amplitude of the electrical signal shunted to the antenna port decreases as the operating frequency increases, and the phase difference between the electrical signals shunted to the different antenna ports on the antenna array increases as the operating frequency increases.

According to the beamforming method provided in this embodiment of this application, the pattern in which the amplitude of the electrical signal shunted to the antenna port changes with the operating frequency of the antenna array and the pattern in which the phase difference between the electrical signals shunted to the different antenna ports on the antenna array changes with the operating frequency of the antenna array may be as follows: The amplitude decreases as the operating frequency increases, and the phase difference increases as the operating frequency increases.

With reference to the second aspect, in some implementations of the second aspect, the amplitude of the electrical signal shunted to the antenna port and the operating frequency meet: $R = A1*X^4 + B1*X^3 + C1*X^2 + D1*X + E1$, where R represents the amplitude of the electrical signal, X represents the operating frequency, and A1, B1, C1, D1, and E1 are preset values; and the phase difference between the electrical signals shunted to the different antenna ports on the antenna array and the operating frequency meet: $\Delta P = A2*(300/X)*d*B2$, where $\Delta P$ represents the phase difference between the electrical signals at the different antenna ports, X represents the operating frequency, d represents a distance between the two different antenna ports, and A2 and B2 are preset values.

According to the beamforming method provided in this embodiment of this application, the pattern in which the amplitude of the electrical signal shunted to the antenna port changes with the operating frequency of the antenna array and the pattern in which the phase difference between the electrical signals shunted to the different antenna ports on the antenna array changes with the operating frequency of the antenna array meet preset correspondences, thereby enabling an amplitude of an electrical signal shunted to an antenna port and a phase difference between electrical signals shunted to different antenna ports to be designed based on different operating frequencies according to the preset correspondences.

With reference to the second aspect, in some implementations of the second aspect, the feeding network is a power divider.

According to the beamforming method provided in this embodiment of this application, an implementation of the feeding network is a power divider.

With reference to the second aspect, in some implementations of the second aspect, the power divider includes one input port and 10 output ports, the 10 output ports respectively provide an electrical signal for 10 antenna ports, and the amplitude of the electrical signal shunted to the antenna port includes:

|      | Frequency |           |           |           |           |
|------|-----------|-----------|-----------|-----------|-----------|
|      | 1.710 GHz | 1.955 GHz | 2.200 GHz | 2.445 GHz | 2.690 GHz |
| Port |           |           | Amplitude |           |           |
| 1    | 0.59      | 0.33      | 0.18      | 0.1       | 0.09      |
| 2    | 0.64      | 0.47      | 0.37      | 0.29      | 0.27      |
| 3    | 0.78      | 0.7       | 0.62      | 0.56      | 0.54      |
| 4    | 0.92      | 0.89      | 0.86      | 0.83      | 0.82      |
| 5    | 1         | 1         | 1         | 1         | 1         |
| 6    | 1         | 1         | 1         | 1         | 1         |
| 7    | 0.92      | 0.89      | 0.86      | 0.83      | 0.82      |
| 8    | 0.78      | 0.7       | 0.62      | 0.56      | 0.54      |
| 9    | 0.64      | 0.47      | 0.37      | 0.29      | 0.27      |
| 10   | 0.59      | 0.33      | 0.18      | 0.1       | 0.09      |

A phase of the electrical signal shunted to the antenna port includes:

|      | Frequency |           |           |           |           |
|------|-----------|-----------|-----------|-----------|-----------|
|      | 1.710 GHz | 1.955 GHz | 2.200 GHz | 2.445 GHz | 2.690 GHz |
| Port |           |           | Phase     |           |           |
| 1    | 0         | 0         | 0         | 0         | 0         |
| 2    | 30        | 33.7      | 37        | 40.7      | 44        |
| 3    | 60        | 67.4      | 74        | 81.4      | 88        |
| 4    | 90        | 101.1     | 111       | 122.1     | 132       |
| 5    | 120       | 134.5     | 148       | 162.8     | 176       |
| 6    | 150       | 168.26    | 185       | 203.5     | 220       |
| 7    | 180       | 201.9     | 222       | 244.2     | 264       |
| 8    | 210       | 235.54    | 259       | 284.9     | 308       |
| 9    | 240       | 269.18    | 296       | 325.6     | 352       |
| 10   | 270       | 302.82    | 333       | 366.3     | 396       |

With reference to the second aspect, in some implementations of the second aspect, a plurality of antenna arrays are divided into two columns of antenna arrays in a direction perpendicular to a horizontal plane; and a director or a reflector is disposed between every two corresponding antenna arrays of the two columns of antenna arrays in a vertical direction, where an even-numbered antenna array numbered from top to bottom in a vertical direction in one column of antenna arrays and an odd-numbered antenna array numbered from top to bottom in a vertical direction in the other column of antenna arrays form an antenna array group, and directions of beams formed by the antenna arrays in the antenna array group are changed by the director and the reflector.

According to the beamforming method provided in this embodiment of this application, the plurality of antenna arrays may be arranged in a shape of a "snake", to reduce a total antenna size.

According to a third aspect, an antenna is provided, including the beamforming apparatus in any one of the first aspect and the implementations of the first aspect.

According to a fourth aspect, a device is provided, including the antenna in the third aspect.

DESCRIPTION OF EMBODIMENTS

The following describes technical solutions of this application with reference to the accompanying drawings.

Figure 1:
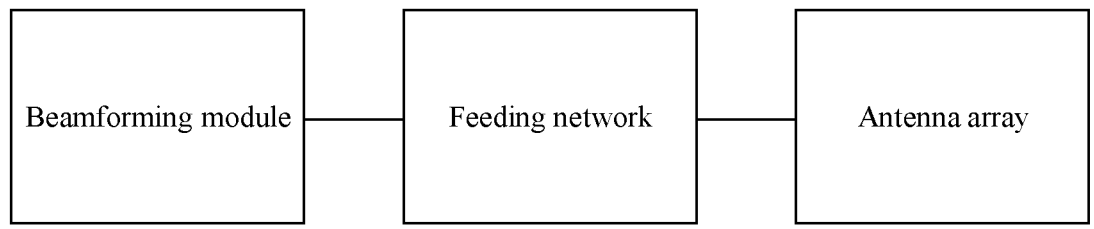
FIG. 1 is a diagram of a conventional Butler feeding network.

FIG. 1 is a schematic diagram of a beamforming apparatus according to an embodiment. The beamforming apparatus includes a beamforming module, an antenna array, and a feeding network.

Each antenna array includes at least one antenna element, and each antenna element includes an antenna port. The antenna element mentioned in this embodiment of this application is a device connecting an air interface and a circuit in a communication system, and is referred to as an antenna for short. The air interface is an interface between a mobile terminal device and a base station, and usually is a protocol air interface.

As mobile communication develops, a communication system has an increasingly high requirement on capacity. An effective method to increase a system capacity is to use a multibeam antenna. The multibeam antenna is an antenna capable of generating a plurality of narrow beams. These narrow beams (which may also be referred to as meta-beams) may be combined into one or several shaped beams, to cover a specific air space. The multibeam antenna is available in three basic forms: a lens form, a reflective surface form, and a phased array form. The multibeam antenna usually includes a beamforming network and the foregoing antenna array connected to the beamforming network. The beamforming network is a circuit network with a function of performing beamforming processing on output or input signals of an antenna array. Beamforming is a process of obtaining a desired beam shape or direction by performing a series of processing steps such as power allocation, power combining, calculating a weighted sum of amplitudes or phases, calculating a sum of delays, and calculating a product of delays. Herein, a meaning of the circuit network is broad. In this embodiment of this application, the circuit network includes a circuit network corresponding to the beamforming module shown in FIG. 1 and the feeding network shown in FIG. 1.

It should be understood that it is difficult for an existing multibeam antenna to ensure shape-maintaining capabilities of beams at a specific wideband, and the antenna has a relatively large size. Shape-maintaining of beams means that a shape of an electromagnetic wave radiated by an antenna is expected to remain unchanged, or a change in the shape can bring beneficial effects. In addition, it is considered, based on some implementations, that an antenna size should not be excessively large. A beamforming method and apparatus provided in the embodiments of this application can improve shape-maintaining capabilities of beams formed by an antenna array and provide an antenna with a size meeting a requirement.

Figure 2:
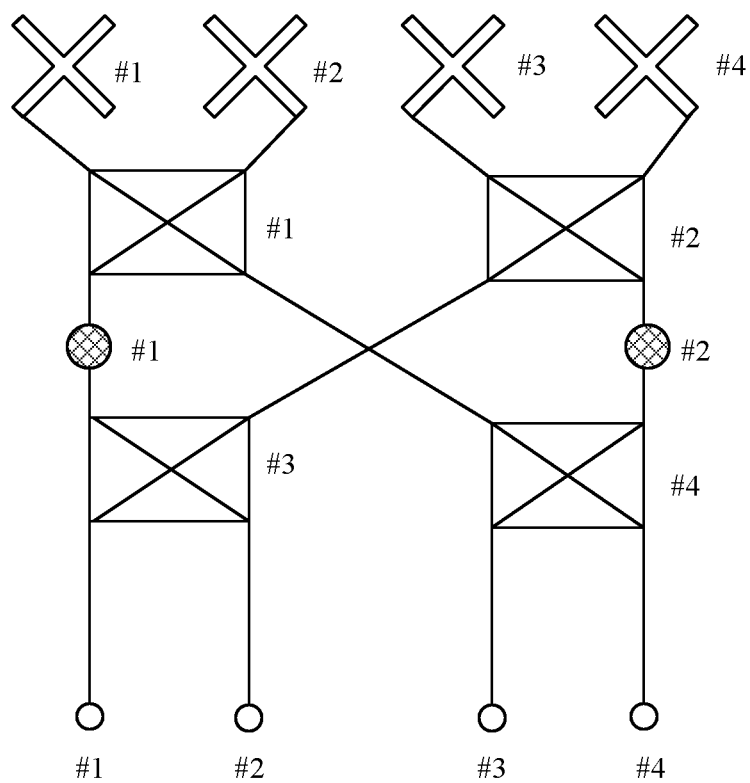
FIG. 2 is a diagram of a conventional multibeam antenna.
Figure 3:
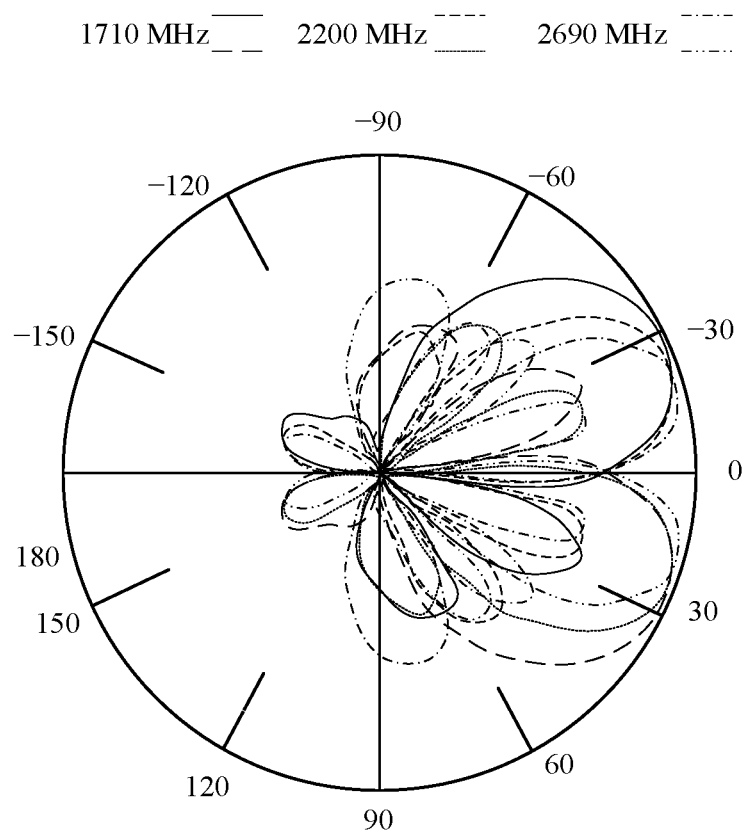
FIG. 3 is a diagram of a beam shape.
Figure 4:
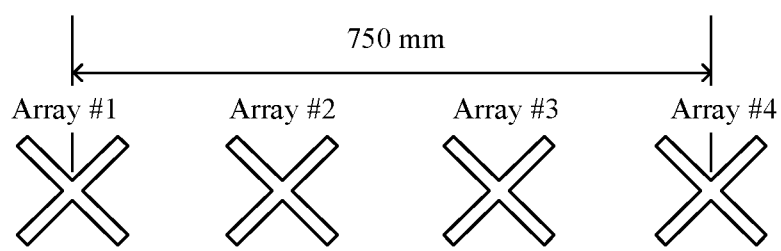
FIG. 4 is a diagram of antenna arrays forming two beams.

For ease of understanding of the beamforming method and apparatus provided in the embodiments of this application, the following first briefly describes, with reference to FIG. 2 to FIG. 4, why it is difficult for the existing multibeam antenna to ensure shape-maintaining capabilities of beams at a specific wideband.

FIG. 2 is a schematic diagram of a conventional multibeam antenna. The multibeam antenna includes a Butler feeding network and antenna arrays. It should be understood that the multibeam antenna should further include a circuit network corresponding to a beamforming module. Because the circuit network corresponding to the beamforming module is not limited in the embodiments of this application, and an improvement in the feeding network in the multibeam antenna is mainly described, the circuit network corresponding to the beamforming module is not shown in FIG. 2.

The Butler feeding network is a passive network that implements beamforming by using an analog method. Basic units included in the Butler feeding network are 3 dB quadrature directional couplers (for example, a 3 dB bridge #1 to a 3 dB bridge #4 shown in FIGS. 2) and 45° fixed phase shifters (for example, a 45° phase shifter #1 and a 45° phase shifter #2 shown in FIG. 2). In the Butler feeding network, a quantity of input ports is the same as a quantity of output ports. After a signal is input from an input port, energy may be evenly distributed to each output port, and a constant phase difference is generated between adjacent output ports. If each output port is connected to an antenna array (for example, an antenna array #1 to an antenna array #4 shown in FIG. 2), different antenna arrays can obtain beams with different pointing angles in space because phases of excitation signals are different. With reference to FIG. 3, the following describes how two beams formed by the multibeam antenna shown in FIG. 2 change with an operating frequency of the multibeam antenna. FIG. 3 is a schematic diagram of a beam shape.

It can be learned from FIG. 3 that the multibeam antenna shown in FIG. 2 can generate two beams based on the Butler feeding network, and widths and directions of the beams both change when the operating frequency of the antenna array changes. When the operating frequency of the multibeam antenna system shown in FIG. 2 is 1710 MHz, the two generated beams have relatively large widths, and their respective directions are located at −30° and 30°. When the operating frequency of the multibeam antenna system shown in FIG. 2 is 2690 MHz, widths of the two generated beams are narrower than those of the two beams that are generated when the operating frequency is 1710 MHz, and their respective directions are located at −15° and 15°. In other words, the widths and directions of the beams generated by the multibeam antenna shown in FIG. 2 change with the operating frequency of the antenna array.

It should be understood that a main reason why the widths and directions of the beams generated by the multibeam antenna shown in FIG. 2 change with the operating frequency is as follows: The Butler feeding network in the multibeam antenna shown in FIG. 2 can only implement a phase difference between signals at different output ports. When the operating frequency of the antenna array changes, signals at the output ports of the Butler feeding network do not change with the operating frequency of the antenna array. A direction of a beam is mainly related to amplitudes of input signals at antenna ports on each antenna array, a phase difference between signals at different output ports, and a physical position of each antenna array. Phases of the input signals at the antenna ports on each antenna array are assigned by a feeding network. The physical position of each antenna array is set when an antenna is shipped from a factory, and is usually fixed. When an operating frequency of the antenna array changes, the physical position of each antenna array does not change. Therefore, to enable shapes of beams generated by the multibeam antenna to be the same at different operating frequencies of the antenna array, it is necessary to design the amplitudes of the input signals at the antenna ports on the antenna array and a phase difference between the input signals at different antenna ports, to improve shape-maintaining capabilities of beams generated by the multibeam antenna. The following describes in detail with reference to FIG. 5 and FIG. 6A to FIG. 6C how to design phases of input signals at antenna ports on an unconventional antenna array in the embodiments of this application. Details are not described herein.

Further, when two beams are implemented by using a Butler feeding network, four antenna arrays are required. FIG. 4 is a schematic diagram of antenna arrays forming two beams. At operating frequencies of 690 MHz to 960 MHz, a distance between two antenna arrays that are adjacent in a horizontal direction is 250 mm. In this case, a width of an entire multibeam antenna increases to 750 mm. However, an antenna width acceptable to an operator is within 500 mm. In other words, when the multibeam antenna is implemented by using a Butler feeding network, a width of the antenna cannot meet a requirement of the operator.

To avoid that the beams formed by the multibeam antenna system shown in FIG. 2 encounter the problem shown in FIG. 3, the embodiments of this application provide a beamforming method and apparatus, to improve, by controlling a pattern in which an amplitude of an electrical signal at an output port of a feeding network changes with an operating frequency of the antenna array and a pattern in which a phase difference between electrical signals at different output ports changes with the operating frequency of the antenna array, shape-maintaining capabilities of beams formed by the antenna array.

For ease of understanding of the beamforming method and apparatus provided in the embodiments of this application, the following first briefly describes several basic concepts used in the embodiments of this application.

1. Power Divider

A power divider is a device that divides energy of an input signal into a plurality of channels of signals with equal or unequal output energy. Alternatively, the power divider may combine energy of a plurality of channels of signals into one output, and may also be referred to as a combiner in this case. A specific degree of isolation should be guaranteed between a plurality of output ports of a power divider. Power dividers are usually classified into one-to-two (one input and two outputs) power dividers, one-to-three (one input and three outputs) power dividers, and the like by output. Main technical parameters of the power divider are power loss (including insertion loss, allocation loss, and reflection loss), voltage standing wave ratios of each port, isolation between power allocation ports, amplitude balance, phase balance, power capacity, frequency band width, and the like. A design structure of the power divider is closely related to an operating frequency.

2. Director

As a common antenna component, a director plays roles of improving consistency in horizontal beam widths and increasing gains. The director deflects an antenna element beam toward a direction of the director and narrows the beam. To reduce costs and facilitate mass production, most directors are manufactured by using a single-sided printed circuit board (PCB) process. The director includes one dielectric substrate and one metal layer. For electromagnetic waves penetrating the foregoing planar structure, the director implements different degrees of beam aggregation based on different frequencies, so that electromagnetic waves in an operating frequency band finally have an almost same horizontal half-power beam width.

3. Reflector

A reflector deflects a beam toward a direction opposite to the reflector and narrows the beam.

4. Frequency

A frequency is an absolute frequency value, and is usually a center frequency of a modulated signal. A frequency is a number assigned to a fixed frequency.

With reference to FIG. 5 and FIG. 6A to FIG. 6C, the following describes in detail the beamforming method and apparatus provided in the embodiments of this application.

Figure 5:
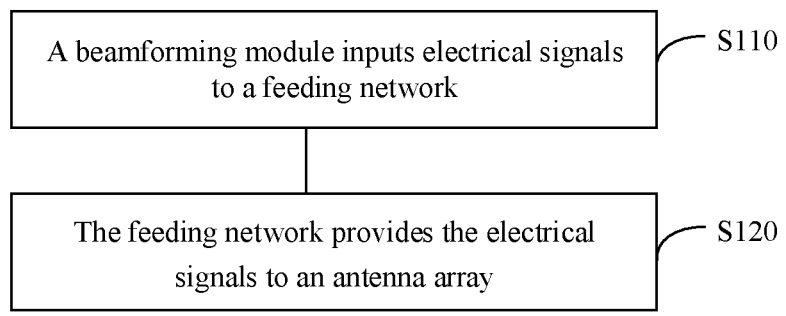
FIG. 5 is a flowchart of a beamforming method according to an embodiment of this application.

FIG. 5 is a flowchart of a beamforming method according to an embodiment of this application.

The beamforming method includes the following steps.

S110: A beamforming module inputs electrical signals to a feeding network.

The beamforming module includes N beam ports, where each beam port is configured to provide one channel of electrical signals, and N is a positive integer. It should be understood that the beamforming module providing electrical signals is not limited in this embodiment of this application, and may be any existing circuit network capable of providing electrical signals to a feeding network.

S120: The feeding network provides the electrical signals to an antenna array.

An input port of the feeding network receives the electrical signals sent by the beamforming module. An internal circuit of the feeding network shunts the electrical signals received by the receive port of the feeding network to antenna ports of the antenna array. The electrical signals received at the antenna ports on the antenna array are used to control shapes of beams formed by the antenna array. It should be understood that design of the antenna array is not described in the embodiment shown in FIG. 5.

An amplitude of an electrical signal output by the feeding network to each antenna port on the antenna array and an operating frequency of the antenna array meet a first correspondence. A phase difference between electrical signals output by the feeding network to different antenna ports on the antenna array and the operating frequency meet a second correspondence.

When the operating frequency of the antenna array changes, amplitudes of M channels of electrical signals respectively sent by the feeding network to M antenna arrays, and a phase difference between every two channels of electrical signals of the M channels of electrical signals change accordingly, so that shapes of beams that the electrical signals received at the antenna ports on the antenna array that form when the operating frequency changes, do not change basically.

In an implementation, the feeding network can respond based on different operating frequencies of the antenna array, so that the amplitude of the electrical signal output to each antenna port on the antenna array decreases as the operating frequency of the antenna array increases, and a phase difference between electrical signals output to every two antenna ports on the antenna array increases as the operating frequency of the antenna array increases. In addition, a change result of the amplitude of the electrical signal at each antenna port, and a change result of the phase difference between the electrical signals at the different antenna ports, enable the shapes of the beams formed by the antenna array to remain unchanged when the operating frequency of the antenna array changes.

In this embodiment of this application, an amplitude of an electrical signal shunted to an antenna port on the antenna array decreases as the operating frequency increases, and the amplitude of the electrical signal shunted to the antenna port and the operating frequency meet a first correspondence:

$R = A1*X^4 + B1*X^3 + C1*X^2 + D1*X + E1$, where R represents the amplitude of the electrical signal, X represents the operating frequency, and A1, B1, C1, D1, and E1 are preset values. A1, B1, C1, D1, and E1 may be adjusted for different antenna ports. It should be understood that values of A1, B1, C1, D1, and E1 are not limited in this embodiment of this application, and may be values obtained based on a large quantity of experiments.

A phase difference between electrical signals shunted to two antenna ports on the antenna array increases as the operating frequency increases, and the phase difference between the electrical signals shunted to the two antenna ports on the antenna array and the operating frequency meet a second correspondence:

$\Delta P = A2*(300/X)*d*B2$, where $\Delta P$ represents the phase difference, X represents the operating frequency, d represents a distance between the two different antenna ports, and A2 and B2 are preset values. Optionally, A2 is $2\pi$, and B2 is $\sin\theta$, where $\theta$ is a preset beam direction. For example, the direction is 30°.

It should be understood that values of A2 and B2 are not limited in this embodiment of this application, and may be values obtained based on a large quantity of experiments.

Figure 6A:
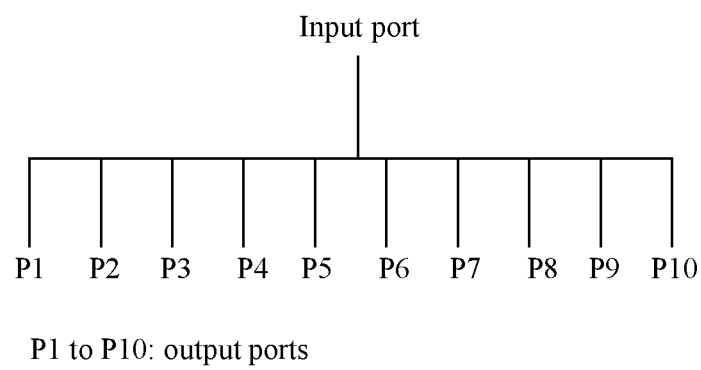
FIG. 6A to FIG. 6C are diagrams of a feeding network according to this application.
Figure 6B:
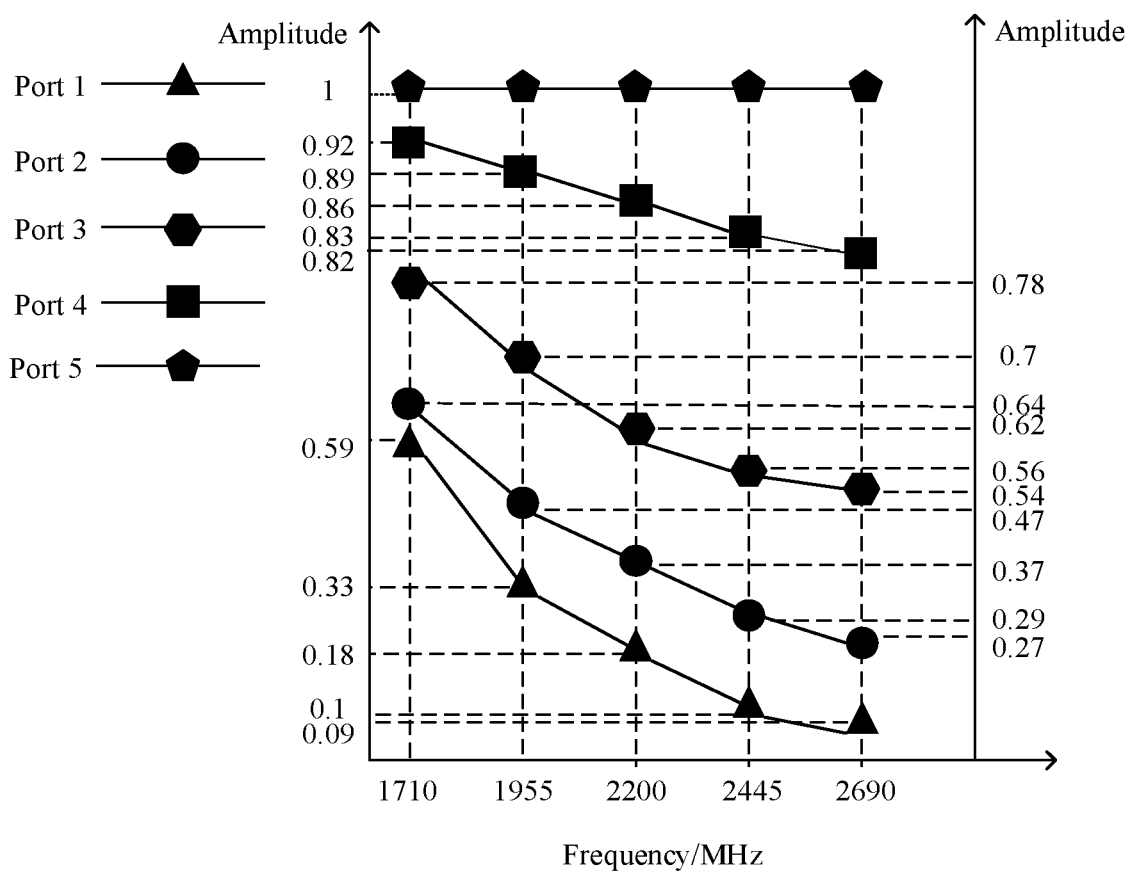
Figure 6C:
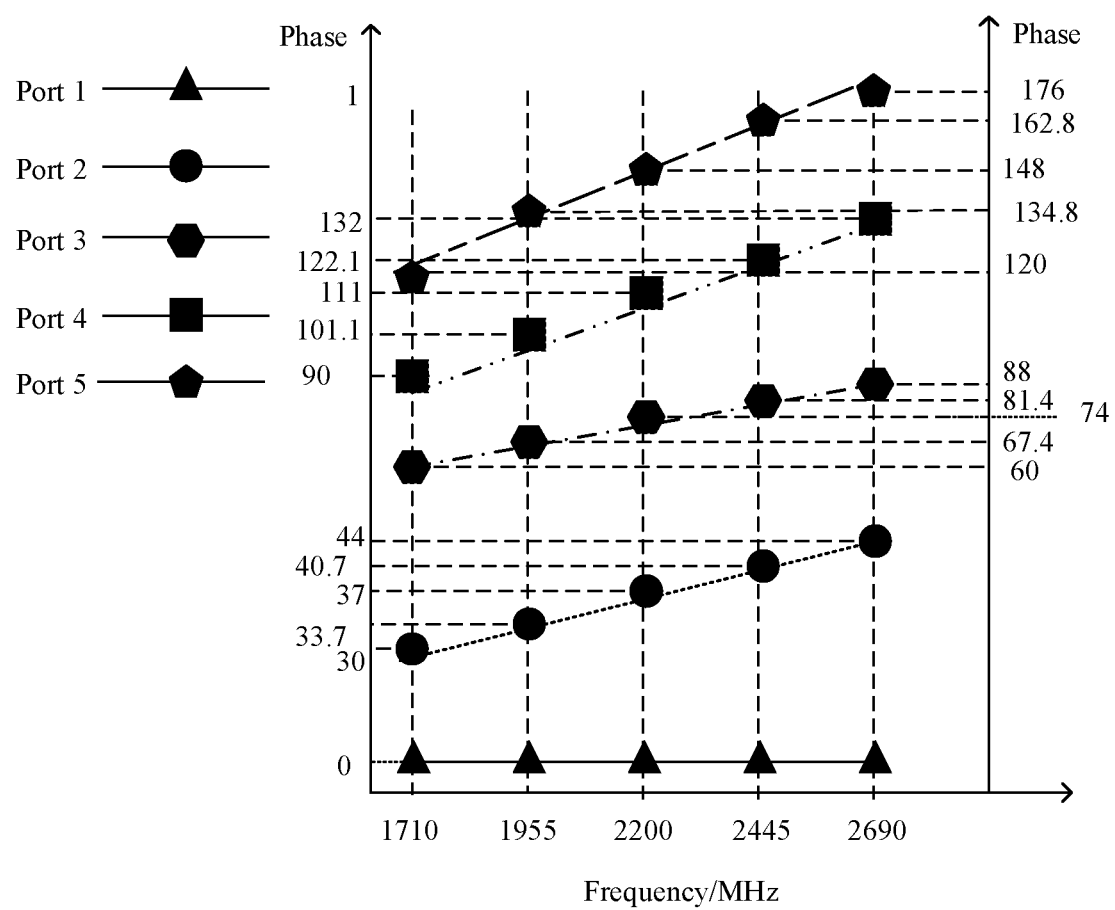

With reference to FIG. 6A to FIG. 6C, by using an example in which input signals of a feeding network are one channel of electrical signals, and outputs of the feeding network are 10 channels of electrical signals and respectively provide electrical signals for 10 antenna ports, the following describes in detail that as an operating frequency of an antenna array changes, the amplitudes of the 10 channels of electrical signals sent by the feeding network to the 10 antenna ports change, and how a phase difference between every two channels of electrical signals of the 10 channels of electrical signals changes to maintain shapes and directions of beams formed by the antenna array at different operating frequencies, basically unchanged.

It should be understood that FIG. 6A to FIG. 6C are merely an example and do not constitute any limitation on the protection scope of this application. The beamforming method shown in FIG. 5 may be applied to any scenario in which shapes and directions of beams formed by the antenna array at different operating frequencies need to be maintained unchanged. The antenna array does not necessarily include 10 antenna ports.

FIG. 6A to FIG. 6C are diagrams of a feeding network according to this application. For example, one input port of the feeding network is connected to any one of the N beam ports of the foregoing beamforming module, and receives electrical signals sent by the beam port. The 10 output ports of the feeding network are connected to 10 antenna ports and send electrical signals to the 10 antenna ports, respectively. FIG. 6A is a diagram of a feeding network, which includes one input port and 10 output ports. It should be understood that FIG. 6A is merely an example and does not constitute any limitation on the protection scope of this application. In this application, there is only a limitation that an amplitude of an electrical signal output by an output port of the feeding network and a phase difference between electrical signals output by different output ports of the feeding network may change with an operating frequency of an antenna array connected to the output ports. A quantity of input ports of the feeding network and a quantity of output ports of the feeding network are not limited. For example, the feeding network may alternatively have eight or six output ports.

FIG. 6B is a diagram of amplitudes of electrical signals output by the output ports of the feeding network to the antenna ports changing with the operating frequency of the antenna array. When the operating frequency of the antenna array increases from 1.710 GHz to 1.955 GHz, 2.200 GHz, 2.445 GHz, and 2.690 GHz, the amplitudes of the electrical signals received by the 10 antenna ports decrease as the operating frequency increases. The changes of amplitudes of electrical signals received by different antenna ports are shown in Table 1.

TABLE 1

| Port | Frequency | | | | |
|---|---|---|---|---|---|
| | 1.710 GHz | 1.955 GHz | 2.200 GHz | 2.445 GHz | 2.690 GHz |
| | Amplitude | | | | |
| 1 | 0.59 | 0.33 | 0.18 | 0.1 | 0.09 |
| 2 | 0.64 | 0.47 | 0.37 | 0.29 | 0.27 |
| 3 | 0.78 | 0.7 | 0.62 | 0.56 | 0.54 |
| 4 | 0.92 | 0.89 | 0.86 | 0.83 | 0.82 |
| 5 | 1 | 1 | 1 | 1 | 1 |

TABLE 1-continued

| | Frequency | | | | |
|---|---|---|---|---|---|
| Port | 1.710 GHz | 1.955 GHz | 2.200 GHz Amplitude | 2.445 GHz | 2.690 GHz |
| 6 | 1 | 1 | 1 | 1 | 1 |
| 7 | 0.92 | 0.89 | 0.86 | 0.83 | 0.82 |
| 8 | 0.78 | 0.7 | 0.62 | 0.56 | 0.54 |
| 9 | 0.64 | 0.47 | 0.37 | 0.29 | 0.27 |
| 10 | 0.59 | 0.33 | 0.18 | 0.1 | 0.09 |

For ports 1 and 10, a relational expression that an amplitude of an electrical signal at an antenna port and an operating frequency meet is as follows: $R=A1*X^4+B1*X^3+C1*X^2-D1*X+E1$, where R represents the amplitude of the electrical signal, X represents the operating frequency, A1=0.5, B1=4.3, C1=15.5, D1=-26, and E1=17.1.

For ports 2 and 9, a relational expression that an amplitude of an electrical signal at an antenna port and an operating frequency meet is as follows: $R=A1*X^4+B1*X^3+C1*X^2-D1*X+E1$, where R represents the amplitude of the electrical signal, X represents the operating frequency, A1=1, B1=-9.2, C1=30.7, D1=-46, and E1=26.7.

For ports 3 and 8, a relational expression that an amplitude of an electrical signal at an antenna port and an operating frequency meet is as follows: $R=A1*X^4+B1*X^3+C1*X^2-D1*X+E1$, where R represents the amplitude of the electrical signal, X represents the operating frequency, A1=0, B1=0.23, C1=-1.3, D1=2.26, and E1=-0.3.

For ports 4 and 7, a relational expression that an amplitude of an electrical signal at an antenna port and an operating frequency meet is as follows: $R=A1*X^4+B1*X^3+C1*X^2-D1*X+E1$, where R represents the amplitude of the electrical signal, X represents the operating frequency, A1=0.23, B1=-1.9, C1=6, D1=-8.3, and E1=5.3.

For ports 5 and 6, a relational expression that an amplitude of an electrical signal at an antenna port and an operating frequency meet is as follows: $R=A1*X^4+B1*X^3+C1*X^2-D1*X+E1$, where R represents the amplitude of the electrical signal, X represents the operating frequency, A1=0, B1=0, C1=0, D1=0, and E1=1.

It should be understood that the foregoing values of A1, B1, C1, D1, and E1 for different ports are merely examples, and do not constitute any limitation on the protection scope of this application. In this application, it is only necessary to ensure that shapes of beams formed by the antenna array at different operating frequencies are basically the same.

FIG. 6C is a schematic diagram of phases of electrical signals output by the output ports of the feeding network to the antenna ports changing with the operating frequency of the antenna array. When the operating frequency of the antenna array increases from 1.710 GHz to 1.955 GHz, 2.200 GHz, 2.445 GHz, and 2.690 GHz, a phase difference between electrical signals received by every two of the 10 antenna ports increases as the operating frequency increases. The changes of phases of electrical signals received by different antenna ports are shown in Table 2. A phase of a port 1 is preset to 0, and a pointing angle of a formed beam is preset to 30°.

TABLE 2

| | Frequency | | | | |
|---|---|---|---|---|---|
| Port | 1.710 GHz | 1.955 GHz | 2.200 GHz Phase | 2.445 GHz | 2.690 GHz |
| 1 | 0 | 0 | 0 | 0 | 0 |
| 2 | 30 | 33.7 | 37 | 40.7 | 44 |
| 3 | 60 | 67.4 | 74 | 81.4 | 88 |
| 4 | 90 | 101.1 | 111 | 122.1 | 132 |
| 5 | 120 | 134.5 | 148 | 162.8 | 176 |
| 6 | 150 | 168.26 | 185 | 203.5 | 220 |
| 7 | 180 | 201.9 | 222 | 244.2 | 264 |
| 8 | 210 | 235.54 | 259 | 284.9 | 308 |
| 9 | 240 | 269.18 | 296 | 325.6 | 352 |
| 10 | 270 | 302.82 | 333 | 366.3 | 396 |

Because the 10 output ports of the feeding network are distributed symmetrically on left and right sides, FIG. 6B and FIG. 6C describe only amplitudes and phases of electrical signals received by half of the antenna ports. Changes of amplitudes and phases of a port 6 to a port 10 with the power are similar to changes of amplitudes and phases of a port 1 to a port 5 with the power, and are not shown in FIG. 6B and FIG. 6C for simplicity.

It should be understood that the amplitudes and phases of the electrical signals input from the different ports at the different frequencies shown in Table 1 and Table 2 are merely an example, are used to indicate that amplitudes of electrical signals input from different ports at different frequencies are different and phases of electrical signals input from different ports at different frequencies are different, and do not constitute any limitation on the protection scope of this application. For example, when the frequency is 1.710 GHz, a designed amplitude of an electrical signal output by the feeding network to the port 1 may be 0.59+Δ (Δ may be a preset value). A value is not limited in this application, provided that shapes of beams formed by the antenna array at different frequencies basically do not change.

It should be further understood that the amplitudes and phases of the electrical signals input from the different ports at the different frequencies shown in Table 1 and Table 2 are merely relative values, instead of absolute values. For example, the values in Table 1 and Table 2 may be all multiplied or divided by a multiple.

Figure 7:
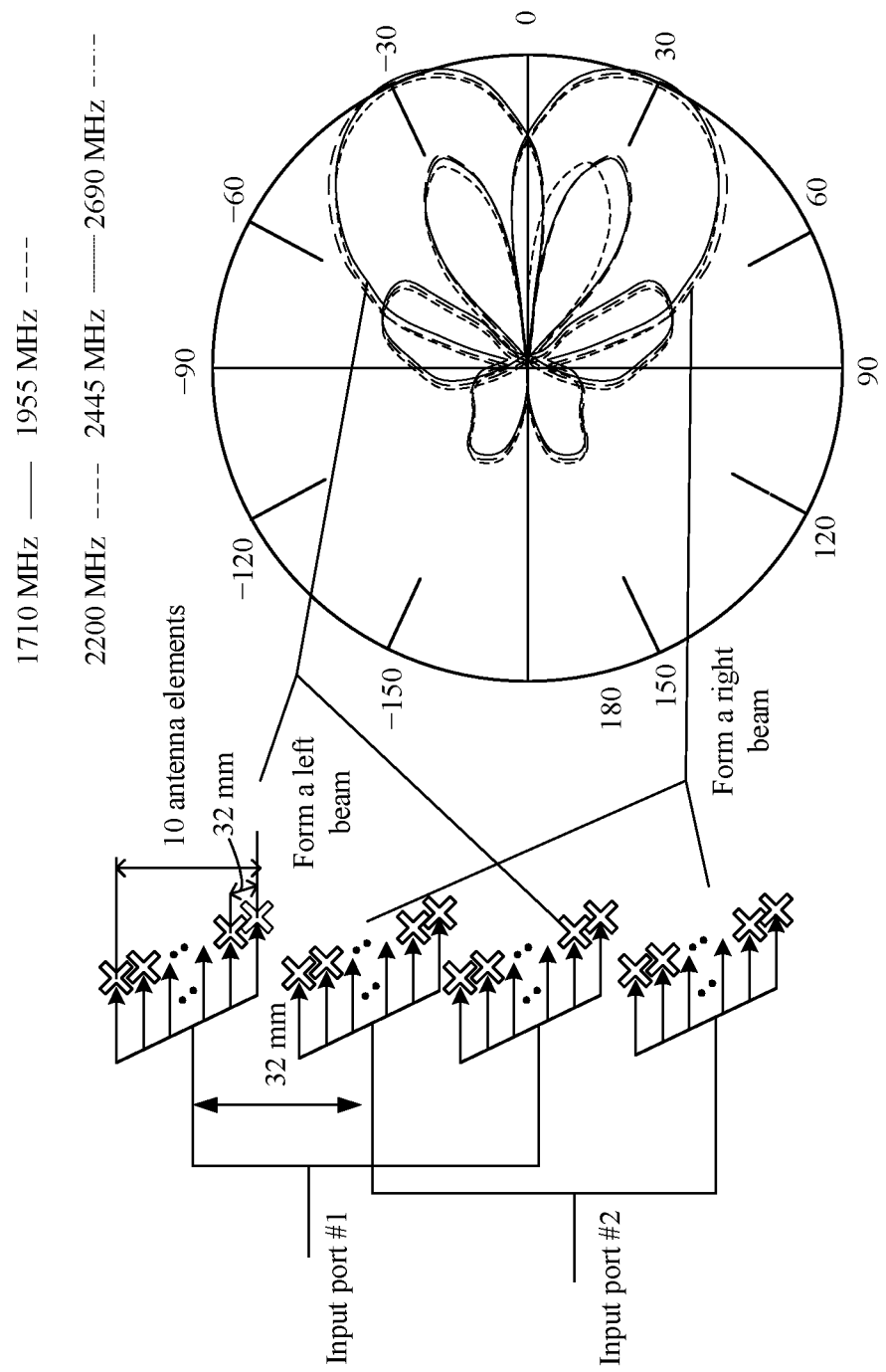
FIG. 7 is a diagram of a multibeam antenna according to an embodiment of this application.

FIG. 6A to FIG. 6C use an example in which a feeding network provides electrical signals to 10 antenna ports of one antenna array to describe changes of amplitudes and phases of electrical signals output by the feeding network. For a multibeam antenna, a feeding network may provide electrical signals for a plurality of antenna arrays. FIG. 7 is a schematic diagram of a multibeam antenna according to an embodiment of this application. The schematic diagram includes a feeding network and a plurality of antenna arrays. The multibeam antenna operates at a frequency band of 1.7 GHz to 2.6 GHz. In a vertical direction, there are four antenna arrays, and an antenna array spacing is 32 mm; and in a horizontal direction, each antenna array includes 10 antenna elements, and an antenna element spacing is 32 mm. Distribution of amplitudes and phases of electrical signals output by the feeding network to antenna ports are shown in FIG. 6B and FIG. 6C above. Details are not described herein again.

By using shapes and directions of two beams formed at different operating frequencies, FIG. 7 indicates that the beamforming method provided in the embodiments of this application is different from an existing beamforming method. As shown in FIG. 7, according to the beamforming method provided in the embodiments of this application, amplitudes and phases of electrical signals received by 10 antenna ports on each antenna array are controlled, thereby controlling shapes and directions of beams formed by antenna arrays corresponding to each input port at different operating frequencies to remain basically unchanged.

Figure 8:
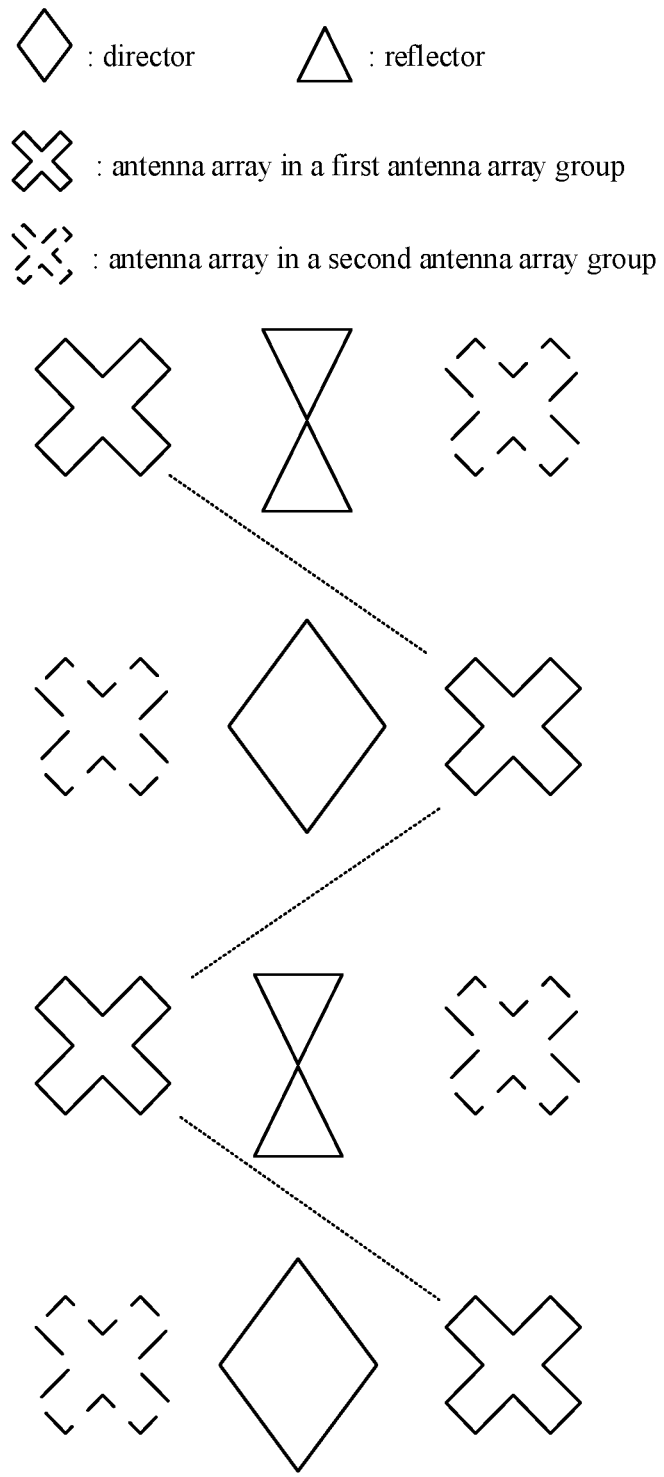
FIG. 8 is a diagram of an antenna array arrangement according to an embodiment of this application.

To avoid that the multibeam antenna system shown in FIG. 2 encounters the problem shown in FIG. 4 when forming a plurality of beams, an embodiment of this application provides an antenna array forming method. As shown in FIG. 8, arrays are arranged in a shape of a snake, and a directional slicing technology is used to reduce an antenna area required for forming a multibeam antenna.

As shown in FIG. 8, a plurality of antenna arrays are arranged in two columns in a direction perpendicular to a horizontal plane, to form two columns of antenna arrays. A director or a reflector is disposed between every two corresponding antenna arrays of the two columns of antenna arrays in a vertical direction. An even-numbered antenna array numbered from top to bottom in a vertical direction in one column of antenna arrays and an odd-numbered antenna array numbered from top to bottom in a vertical direction in the other column of antenna arrays form an antenna array group (for example, a first antenna array group and a second antenna array group shown in FIG. 8). Directions of beams formed by the antenna arrays in the antenna array group are changed by the director and the reflector, to obtain beams that meet a requirement. In this special array arrangement manner, an antenna area can be utilized to a maximum extent.

Figure 9:
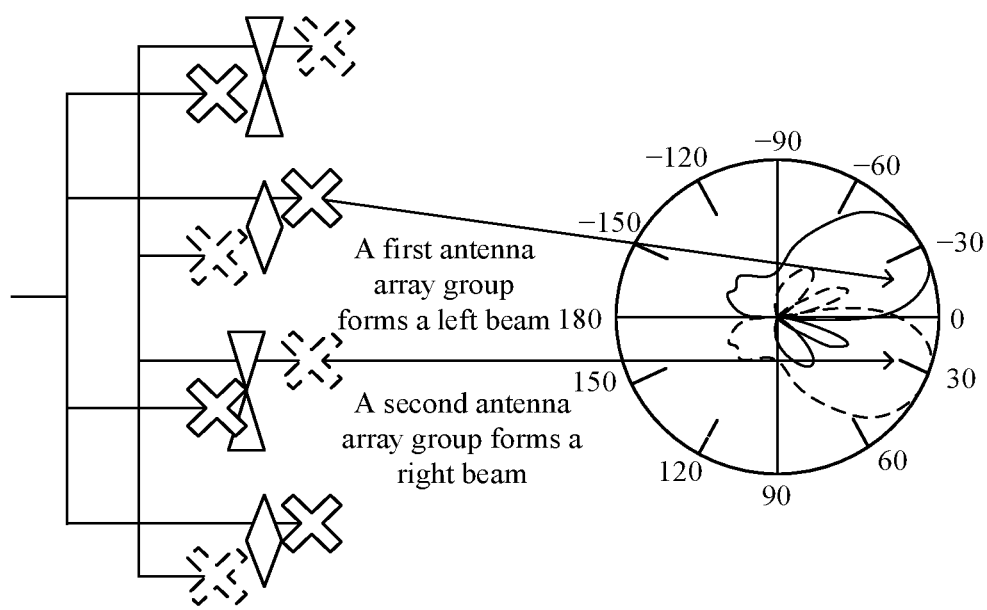
FIG. 9 is a diagram of a beam according to an embodiment of this application.

Two beams formed by the first antenna array group and the second antenna array group shown in FIG. 8 are shown in FIG. 9. FIG. 9 is a schematic diagram of a beam according to an embodiment of this application.

The beamforming apparatus in the embodiments of this application may be applied to antenna design. An antenna with the beamforming apparatus provided in this application may be disposed in a network device or a terminal device. The network device or the terminal device may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

In this application, the terms "include", "have", and any variant thereof mean to cover the non-exclusive inclusion, for example, a process, method, system, product, or device that includes a series of steps or units is not necessarily limited to those steps or units that are clearly listed, but may include other steps or units not clearly listed or inherent to such a process, method, product, or device.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units may integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or a part of the steps of the methods in embodiments of this application. The foregoing storage medium includes various media that can store program code, such as a USB flash drive, a removable hard disk drive, a read-only memory (ROM), a random access memory (RAM), a magnetic disk, or an optical disc.

In addition, the term "and/or" in this application describes only an association relationship between associated objects and represents that three relationships may exist. For example, A and/or B may indicate the following three cases: Only A exists, both A and B exist, and only B exists. In addition, the character "\" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beamforming apparatus comprising:
a beamforming module comprising a beam port, the beam port configured to provide first electrical signals;
an antenna array comprising a plurality of antenna ports; and
a feeding network disposed between and coupling the beam port and the plurality of antenna ports, the feeding network configured to shunt the first electrical signals provided by the beam port to the plurality of antenna ports, wherein:
second electrical signals received at the antenna ports are used to control shapes of beams formed by the antenna array;
amplitudes of the second electrical signals shunted to the plurality of antenna ports and an operating frequency of the antenna array meet a first correspondence;
a phase difference between two of the second electrical signals shunted to two different antenna ports and the operating frequency meet a second correspondence;
the first correspondence comprises that the amplitudes decrease as the operating frequency increases; and
the second correspondence comprises that the phase difference increases as the operating frequency increases.

2. The apparatus according to claim 1, wherein the first correspondence comprises:
$R=A1*X^4+B1*X^3+C1*X^2+D1*X+E1$, wherein R represents the amplitudes of the second electrical signals, X represents the operating frequency, and A1, B1, C1, D1 and E1 are preset values; and
the second correspondence comprises:
$\Delta P=A2*(300/X)*d*B2$, wherein $\Delta P$ represents the phase difference, X represents the operating frequency, d represents a distance between the two different antenna ports, and A2 and B2 are preset values.

3. The apparatus according to claim 1, wherein the feeding network comprises a power divider.

4. The apparatus according to claim 3, wherein the power divider comprises one input port and 10 output ports, the 10 output ports providing the second electrical signals for 10 antenna ports, and the amplitudes of the second electrical signals shunted to the antenna port comprises:

| Port | Frequency | | | | |
|---|---|---|---|---|---|
| | 1.710 GHz | 1.955 GHz | 2.200 GHz | 2.445 GHz | 2.690 GHz |
| | | | Amplitude | | |
| 1 | 0.59 V | 0.33 V | 0.18 V | 0.1 V | 0.09 V |
| 2 | 0.64 V | 0.47 V | 0.37 V | 0.29 V | 0.27 V |
| 3 | 0.78 V | 0.7 V | 0.62 V | 0.56 V | 0.54 V |
| 4 | 0.92 V | 0.89 V | 0.86 V | 0.83 V | 0.82 V |
| 5 | 1 V | 1 V | 1 V | 1 V | 1 V |
| 6 | 1 V | 1 V | 1 V | 1 V | 1 V |
| 7 | 0.92 V | 0.89 V | 0.86 V | 0.83 V | 0.82 V |
| 8 | 0.78 V | 0.7 V | 0.62 V | 0.56 V | 0.54 V |
| 9 | 0.64 V | 0.47 V | 0.37 V | 0.29 V | 0.27 V |
| 10 | 0.59 V | 0.33 V | 0.18 V | 0.1 V | 0.09 V; | and phases of the second electrical signals shunted to the plurality of the antenna ports comprises:

| Port | Frequency | | | | |
|---|---|---|---|---|---|
| | 1.710 GHz | 1.955 GHz | 2.200 GHz | 2.445 GHz | 2.690 GHz |
| | | | Phase | | |
| 1 | 0° | 0° | 0° | 0° | 0° |
| 2 | 30° | 33.7° | 37° | 40.7° | 44° |
| 3 | 60° | 67.4° | 74° | 81.4° | 88° |
| 4 | 90° | 101.1° | 111° | 122.1° | 132° |
| 5 | 120° | 134.5° | 148° | 162.8° | 176° |
| 6 | 150° | 168.26° | 185° | 203.5° | 220° |
| 7 | 180° | 201.9° | 222° | 244.2° | 264° |
| 8 | 210° | 235.54° | 259° | 284.9° | 308° |

-continued

| Port | Frequency | | | | |
|---|---|---|---|---|---|
| | 1.710 GHz | 1.955 GHz | 2.200 GHz Phase | 2.445 GHz | 2.690 GHz |
| 9 | 240° | 269.18° | 296° | 325.6° | 352° |
| 10 | 270° | 302.82° | 333° | 366.3° | 396°. |

5. The apparatus according to claim 1, wherein a plurality of antenna arrays are divided into two columns of antenna arrays in a direction perpendicular to a horizontal plane;
wherein a director or a reflector is disposed in a vertical direction between every two corresponding antenna arrays of the two columns of antenna arrays; and
wherein an even-numbered antenna array numbered from top to bottom in a vertical direction in one column of antenna arrays and an odd-numbered antenna array numbered from top to bottom in a vertical direction in the other column of antenna arrays form an antenna array group, and wherein directions of beams formed by the antenna arrays in the antenna array group are changed by the director or the reflector.

6. A beamforming method comprising:
receiving, by a feeding network, first electrical signals from a beamforming module, the beamforming module comprising a beam port, the beam port configured to provide the first electrical signals; and
shunting, by the feeding network, the first electrical signals to a plurality of antenna ports on an antenna array, second electrical signals received at the plurality of antenna ports being used to control shapes of beams formed by the antenna array, wherein;
amplitudes of the second electrical signals shunted to the plurality of antenna ports and an operating frequency of the antenna array meet a first correspondence;
a phase difference between two of the second electrical signals shunted to two different antenna ports and the operating frequency meet a second correspondence;
the first correspondence comprises that the amplitudes decrease as the operating frequency increases; and
the second correspondence comprises that the phase difference increases as the operating frequency increases.

7. The method according to claim 6, wherein the first correspondence comprises:
$R=A1*X^4+B1*X^3+C1*X^2+D1*X+E1$, wherein R represents the amplitudes of the second electrical signals, X represents the operating frequency, and A1, B1, C1, D1 and E1 are preset values; and
the second correspondence comprises:
$\Delta P=A2*(300/X)*d*B2$, wherein $\Delta P$ represents the phase difference, X represents the operating frequency, d represents a distance between the two different antenna ports, and A2 and B2 are preset values.

8. The method according to claim 6, wherein the feeding network comprises a power divider.

9. The method according to claim 8, wherein the power divider comprises one input port and 10 output ports, the 10 output ports providing an electrical signals for 10 antenna ports, and the amplitudes of the electrical signals shunted to the antenna port comprises:

| Port | Frequency | | | | |
|---|---|---|---|---|---|
| | 1.710 GHz | 1.955 GHz | 2.200 GHz Amplitude | 2.445 GHz | 2.690 GHz |
| 1 | 0.59 V | 0.33 V | 0.18 V | 0.1 V | 0.09 V |
| 2 | 0.64 V | 0.47 V | 0.37 V | 0.29 V | 0.27 V |
| 3 | 0.78 V | 0.7 V | 0.62 V | 0.56 V | 0.54 V |
| 4 | 0.92 V | 0.89 V | 0.86 V | 0.83 V | 0.82 V |
| 5 | 1 V | 1 V | 1 V | 1 V | 1 V |
| 6 | 1 V | 1 V | 1 V | 1 V | 1 V |
| 7 | 0.92 V | 0.89 V | 0.86 V | 0.83 V | 0.82 V |
| 8 | 0.78 V | 0.7 V | 0.62 V | 0.56 V | 0.54 V |
| 9 | 0.64 V | 0.47 V | 0.37 V | 0.29 V | 0.27 V |
| 10 | 0.59 V | 0.33 V | 0.18 V | 0.1 V | 0.09 V; | and
phases of the second electrical signals shunted to the plurality of the antenna ports comprises:

| Port | Frequency | | | | |
|---|---|---|---|---|---|
| | 1.710 GHz | 1.955 GHz | 2.200 GHz Phase | 2.445 GHz | 2.690 GHz |
| 1 | 0° | 0° | 0° | 0° | 0° |
| 2 | 30° | 33.7° | 37° | 40.7° | 44° |
| 3 | 60° | 67.4° | 74° | 81.4° | 88° |
| 4 | 90° | 101.1° | 111° | 122.1° | 132° |
| 5 | 120° | 134.5° | 148° | 162.8° | 176° |
| 6 | 150° | 168.26° | 185° | 203.5° | 220° |

-continued

| | Frequency | | | | |
|---|---|---|---|---|---|
| Port | 1.710 GHz | 1.955 GHz | 2.200 GHz Phase | 2.445 GHz | 2.690 GHz |
| 7 | 180° | 201.9° | 222° | 244.2° | 264° |
| 8 | 210° | 235.54° | 259° | 284.9° | 308° |
| 9 | 240° | 269.18° | 296° | 325.6° | 352° |
| 10 | 270° | 302.82° | 333° | 366.3° | 396°. |

10. The method according to claim 6, wherein a plurality of antenna arrays are divided into two columns of antenna arrays in a direction perpendicular to a horizontal plane;
wherein a director or a reflector is disposed in a vertical direction between every two corresponding antenna arrays of the two columns of antenna arrays; and
wherein an even-numbered antenna array numbered from top to bottom in a vertical direction in one column of antenna arrays and an odd-numbered antenna array numbered from top to bottom in a vertical direction in the other column of antenna arrays form an antenna array group, and wherein directions of beams formed by the antenna arrays in the antenna array group are changed by the director and the reflector.

* * * * *